United States Patent [19]

Mascarenas

[11] Patent Number: 4,817,257
[45] Date of Patent: Apr. 4, 1989

[54] METHOD OF MAKING AN ENGINE CRANKSHAFT

[75] Inventor: Paul A. Mascarenas, Brentwood, England

[73] Assignee: Ford Motor Company, Dearborn, Mich.

[21] Appl. No.: 128,373

[22] Filed: Dec. 3, 1987

[30] Foreign Application Priority Data

Nov. 28, 1986 [GB] United Kingdom ............... 8628522

[51] Int. Cl.$^4$ ............................................. B23P 15/00
[52] U.S. Cl. ............................... 29/156.4 R; 29/527.6; 164/76.1; 164/270.1
[58] Field of Search ............ 29/156.4 R, 527.1, 527.5, 29/527.6; 164/76.1, 270.1

[56] References Cited

U.S. PATENT DOCUMENTS

| | | | |
|---|---|---|---|
| 954,923 | 4/1910 | Brock | 29/156.4 R |
| 1,255,409 | 2/1918 | Gordon | 29/156.4 R |
| 2,235,450 | 3/1941 | Groene | 29/156.4 R |
| 2,333,859 | 11/1943 | Groene | 29/156.4 R |
| 3,313,016 | 4/1967 | Seulen et al. | 29/156.4 R |
| 3,545,891 | 12/1970 | Parker | 29/156.4 R |

FOREIGN PATENT DOCUMENTS 1088510 10/1967 United Kingdom .
1114221 5/1968 United Kingdom .
1191202 5/1970 United Kingdom .

*Primary Examiner*—P. W. Echols
*Assistant Examiner*—Irene Cuda
*Attorney, Agent, or Firm*—Joseph W. Malleck; Roger L. May

[57] ABSTRACT

A method of manufacturing a crankshaft 10 comprises casting in place a hollow steel tube 18 into the crankshaft 10 and laser piercing bores 32 in at least the crank pins of the crankshaft to connect with the interior of the steel tube 18.

Laser piercing avoids the risk of blockage of the oil duct by the burrs which would result from conventional drilling.

1 Claim, 1 Drawing Sheet

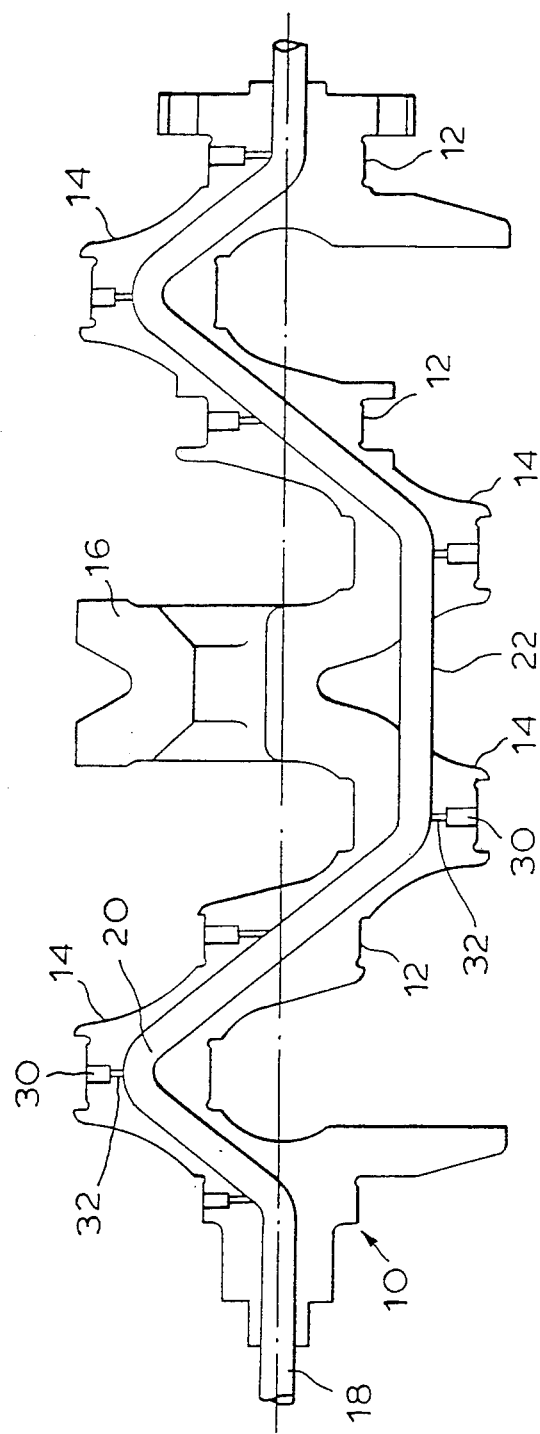

METHOD OF MAKING AN ENGINE CRANKSHAFT

BACKGROUND OF THE INVENTION

1. Technical Field

The present invention relates to the construction of engine crankshafts and, more particularly, to the art of making internal oil passages within such crankshafts.

2. Description of the Prior Art

It is known to incorporate oil ducts in an engine crankshaft to enable lubrication of the main bearings and the big end bearings. Such a construction is advantageous as it allows oil to be fed from a single point to all the bearings of the crankshaft instead of oil being pumped to each main bearing individually.

As is commercially practiced, a duct is formed by drilling axially aligned bores in the crankshaft and plugging the ends of the bores. Radial bores are also machined to further carry the oil to necessary locations. The drilling of the bores in this case is time consuming, not highly cost effective, and accuracy is required to ensure that the bores are correctly aligned to form a continuous duct. Furthermore, there is a tendency for air bubbles to be trapped at discontinuities in the ducts or at their juncture giving rise to inadequate lubrication.

In a further prior art proposal, plastic oil pipes are placed within a hollow crankshaft and a foamed plastic material is cast in the crankshaft to hold the oil pipes in place. In this case, the hollow crankshaft is weakened, especially at the webs of the cranks.

SUMMARY OF THE INVENTION

The invention therefore is a method of constructing a crankshaft with continuous axial and radial oil ducts feeding oil to the bearing surfaces of the crankshaft, which method and resulting crankshaft do not suffer from the foregoing disadvantages.

According to the present invention, there is provided a method of manufacturing a crankshaft which comprises casting a metal tube into the crankshaft and piercing bores by laser in at least the bearing surfaces of the crank pins of the crankshaft to connect with the interior of the cast in place metal tube.

BRIEF DESCRIPTION OF THE DRAWING

The FIGURE is a central sectional elevational view of a crankshaft produced by the method of this invention.

DETAILED DESCRIPTION AND BEST MODE

If a metal tube is placed in a casting mold prior to the pouring in of the molten metal, then an oil duct can automatically be formed in the crankshaft; it does not suffice to drill down into the embedded tube as there is a serious risk of blocking the oil duct by the burrs occurring around the ends of the drilled bore. Deburring cannot readily be carried out and, even if the burrs are successfully removed from the edges of the drilled bore, there is a risk of the oil duct being blocked by the resulting swarf.

Laser piercing permits a bore to be made without burrs and without generating swarf. Furthermore, the accuracy of drilling can be greatly increased, thereby improving the control over the flow rate of the oil. Laser piercing also avoids the risk of breakage of drill bits of very small diameter It is preferable that the embedded metal tube be steel, and should not be too close to the surface of the crankshaft, in order to avoid weakening of the crankshaft. The bores to be made to connect with the oil duct may therefore need to be deep. In this case, it is not essential that the shole depth of the bores should be laser pierced as it is only at the point of penetration into the steel tube that the risk of burring presents a problem. It is possible therefore to drill the first part of the bores in a conventional manner and to laser pierce only the last part of the bores. It is not necessary that the drilled part of the bore should be of the same diameter as the laser pierced part so that the need to use small diameter drill bits can still be avoided.

When molten metal flows over the steel tube in the casting mold, there is a risk of the steel tube melting. The tube could be formed of a more refractory metal different than the cast iron or cast steel of the crankshaft, but this creates a possible problem because of the different properties of the two materials. Also, more refractory metals would make the tube and its bending unduly costly. Low carbon steel tubes cast well in nodular cast iron, creating a fused metallurgical bond therebetween.

Certain parts of the steel tube are exposed to the molten metal for longer than others and it is these parts which risk melting. In particular, a crankshaft is normally cast vertically and filled from the lower end in order to avoid air being trapped. Thus, most of the hot metal will flow across the lower end of the steel tube to be cast into the upper regions of the crankshaft and thus the upper end of the steel tube will be exposed to the molten metal for a shorter time.

It is possible to avoid the risk of melting of the steel tube by increasing the wall thickness of the tube either throughout its length or only in the regions at risk of melting. This may be achieved, for example, by a cladding on the steel tube.

A particularly simple solution is to fill the tube, at least partially, prior to casting of the molten metal into the mold, with a material, such as sand or wax, that increases the thermal capacity. If the material has a lower melting point than the tube, it can flow out during the casting process.

An alternative possible approach is to allow the tube to melt partially, but to prevent its collapse by filling it with a powder such as fine sand. The sand will also increase the thermal capacity in order to resist melting and can be blown out after completion of the casting.

The invention will now be described further, by way of example, with reference to the accompanying drawing which is a section through a crankshaft.

The crankshaft 10 has four main bearings 12 and four cranks 14. Between the two middle cranks, a balancing weight 16 is formed. The whole of the crankshaft is of cast iron construction and a steel tube 18 is cast in situ in the crankshaft 10 to define an oil duct 20 for lubricating the main bearings 12 and the big end bearings on the cranks 14.

The steel tube 18 is of mild steel which is preformed to a desired shape prior to being inserted in the casting mold. As can be seen, the tube 18 is encapsulated entirely within the crankshaft 10 except for a portion 22 which is opposite the balance weight 16. The tube 18 is preformed to have sufficient length so that portion 22 will lay outside the mold during casting of the cast material into the casting cavity. In the case of a five main bearing crankshaft, the tube 18 would be totally contained within the crankshaft 10.

It is important to be able to position the tube 18 accurately during the casting process, and the portion 22 is very advantageous in this respect as it can be gripped directly to determine the angular position of the tube 18 within the mold. In the case of a crankshaft in which the tube 18 is totally encapsulated, it is possible to form the crankshaft with hollow crank pins. The bores of the crank pins are formed by cores in the mold and these cores may be provided with locating recesses for the tube 18.

During casting, the mold is vertical and fills from the lower end. A cladding, consisting of a second layer of mild steel, may be formed around the tube 18 at the lower end to prevent its melting during the casting. Alternatively, the tube may be filled prior to the molten metal being introduced into the mold with a material to increase its thermal capacity, such as sand, oil or wax.

After cooling of the crankshaft, it is necessary to form bores to enable oil in the oil duct 20 to reach the bearing surfaces. These are formed by conventional drilling of blind bores 30 in the bearing portions of the crankshaft to approach the steel tube 18 but not penetrate it; such drilling may employ tool steel rotary drill bits to define the bores. These blind bores may typically be 2.5-3.5 mm in diameter. Next, these blind bores 30 are deepened by laser piercing to connect with the oil duct 20, the diameter of the laser pierced part 32 of the bores 30 being typically between 0.5 mm and 1.0 mm in diameter. Laser piercing may be carried out in accordance with the teaching of U.K. patent No. 1,088,510 which is incorporated herein by reference.

Laser piercing avoids burrs which could cause blockage of the oil duct 20. Furthermore, it enables a small diameter bore to be drilled without the use of a fragile drill bit of slender diameter, such drill bits being frequently repsonsible for stoppages in the course of mass production of drilled components.

It is not essential to form the bores in two parts and the predrilling may be unnecessary if safety regulations allow the use of a laser having sufficient power to drill a hole of the desired diameter and depth within an acceptable time. For smaller engines, a bore of typically 15 mm depth is required, and lasers currently deemed to be safe can pierce such a hole in about two seconds.

It is the big end bearings which present the greater problem in lubrication and the oil duct should feed oil at least to these bearings. Main bearing lubrication could be carried out separately, but it is preferred that the oil duct should feed the main bearings as well as the big end bearings.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

I claim:

1. A method manufacturing a crankshaft having crank pins, which comprises (i) casting in place a hollow metal tube within said crankshaft, and (ii) laser piercing bores in at least the bearing surfaces of said crank pins of the crankshaft to connect with the interior of said metal tube, said metal tube being preformed to a desired shape that is insertable into a casting cavity of a mold, the shape having sufficient length to not totally encapsulate the tube in the cast material or mold during casting, and the part of the tube lying outside the mold during casting serving to align the tube within the mold.

* * * * *